United States Patent
Nose et al.

(10) Patent No.: US 12,548,450 B2
(45) Date of Patent: Feb. 10, 2026

(54) VEHICLE CONTROL DEVICE, VEHICLE CONTROL METHOD, AND NON-TRANSITORY STORAGE MEDIUM STORING VEHICLE CONTROL PROGRAM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/388,027

(22) Filed: Nov. 8, 2023

(65) Prior Publication Data
US 2024/0177610 A1    May 30, 2024

(30) Foreign Application Priority Data
Nov. 24, 2022   (JP) .................................. 2022-187814

(51) Int. Cl.
*G08G 1/16*     (2006.01)
*B60W 30/18*    (2012.01)
(Continued)

(52) U.S. Cl.
CPC ....... *G08G 1/167* (2013.01); *B60W 30/18163* (2013.01); *B60W 50/10* (2013.01);
(Continued)

(58) Field of Classification Search
None
See application file for complete search history.

(56) References Cited

U.S. PATENT DOCUMENTS

| 2016/0091896 A1* | 3/2016 | Maruyama ...... B60W 30/18163 701/23 |
| 2020/0180642 A1* | 6/2020 | Takashiro ............ G05D 1/0061 |
| 2022/0063650 A1* | 3/2022 | Takabatake ........... B60W 10/18 |

FOREIGN PATENT DOCUMENTS

| JP | 2017-033045 A | 2/2017 |
| JP | 2018-149915 A | 9/2018 |

(Continued)

OTHER PUBLICATIONS

English translation of WO-2023175927-A1 (wherein the paragraph numbering provided coincides with any relevant citations to this reference within the accompanying Office Action) (Year: 2023).*

*Primary Examiner* — Jason Holloway
*Assistant Examiner* — Bryant Tang
(74) *Attorney, Agent, or Firm* — Oliff PLC

(57) ABSTRACT

A vehicle control device that is installed at a vehicle configured to perform lane change assistance and that comprises a processor, wherein the processor is configured to: receive a request for a lane change by lane change assistance from an occupant of the vehicle; acquire surroundings information of the vehicle; when the request for a lane change has been received, determine whether or not the lane change by lane change assistance is viable based on the acquired surroundings information; and display a message, asking whether or not the request for a lane change by lane change assistance is to be continued, on a display section provided in a cabin of the vehicle in cases in which the lane change by lane change assistance has been determined to be difficult.

13 Claims, 9 Drawing Sheets

(51) Int. Cl.
*B60W 50/10* (2012.01)
*B60W 50/14* (2020.01)
*B60W 60/00* (2020.01)

(52) U.S. Cl.
CPC .......... *B60W 50/14* (2013.01); *B60W 60/001* (2020.02); *B60W 60/0053* (2020.02); *B60W 60/0059* (2020.02); *B60W 2050/146* (2013.01); *B60W 2554/80* (2020.02)

(56) References Cited

FOREIGN PATENT DOCUMENTS

| | | | |
|---|---|---|---|
| JP | 2020-091778 A | 6/2020 | |
| JP | 2022-041287 A | 3/2022 | |
| WO | WO-2023175927 A1 * | 9/2023 | ...... B60W 30/18163 |

* cited by examiner

FIG.4

| DIFFICULTY LEVEL | SEPARATION X (m) BETWEEN FRONT VEHICLE AND REAR VEHICLE |
|---|---|
| 0 | A m < X |
| 1 | B m < X ≦ A m |
| 2 | C m < X ≦ B m |
| 3 | X ≦ C m |

VEHICLE CONTROL DEVICE, VEHICLE CONTROL METHOD, AND NON-TRANSITORY STORAGE MEDIUM STORING VEHICLE CONTROL PROGRAM

CROSS-REFERENCE TO RELATED APPLICATION

This application is based on and claims priority under 35 USC 119 from Japanese Patent Application No. 2022-187814 filed on Nov. 4, 2022, the disclosure of which is incorporated by reference herein.

BACKGROUND

Technical Field

The present disclosure relates to a vehicle control device, a vehicle control method, and a non-transitory storage medium storing a vehicle control program.

Related Art

Japanese Patent Application Laid-Open (JP-A) No. 2020-091778 discloses a vehicle control device that proposes manual operation by a driver of an ego-vehicle to the driver in cases in which determination has been made that the ego-vehicle would not be able to merge into a merge-destination lane from a cruising lane were the ego-vehicle to continue autonomous driving.

However, in conditions in which lane change by driving assistance is difficult, the technology of JP-A No. 2020-091778 is not able to reflect the intentions of an occupant as to whether to continue attempting lane change by lane change driving assistance (hereafter referred to as "lane change assistance"), namely to simply wait until conditions in which the lane change is viable, or to cancel the request for a lane change by driving assistance.

SUMMARY

The present disclosure provides a vehicle control device, a vehicle control method, and a non-transitory storage medium storing a vehicle control program that are capable of performing driving assistance in which the intentions of an occupant is reflected in conditions in which lane change is difficult.

A vehicle control device of a first aspect is installed at a vehicle configured to perform lane change assistance. The vehicle control device includes a lane change request reception unit that receives a request for a lane change by lane change assistance from an occupant of the vehicle, a surroundings information acquisition unit that acquires surroundings information of the vehicle, a lane change viability determination unit that, when the request for a lane change by lane change assistance has been received at the lane change request reception unit, determines whether or not the lane change by lane change assistance is viable based on the surroundings information acquired by the surroundings information acquisition unit, and a display instruction unit that, in cases in which the lane change by lane change assistance has been determined to be difficult at the lane change viability determination unit, displays a message, asking whether or not the request for a lane change by lane change assistance is to be continued, on a display section provided in a cabin of the vehicle.

In the vehicle control device of the first aspect the surroundings information of the vehicle is acquired using the surroundings information acquisition unit. Moreover, the request for a lane change by lane change assistance is received from the occupant by the lane change request reception unit, for example by an input operation of a turn indicator operation or the like by the occupant.

When the request for lane change by lane change assistance has been received in the lane change request reception unit, based on the surroundings information acquired by the surroundings information acquisition unit, determination is made by the lane change viability determination unit as to whether or not the lane change by lane change assistance is viable.

The message is displayed by the display instruction unit on the display section provided in the vehicle cabin. This message is a message asking whether or not to continue the request for lane change in cases in which lane change by lane change assistance has been determined to be difficult by the lane change viability determination unit. Namely, the occupant is asked whether to continue the request for lane change by lane change assistance and wait until lane change by lane change assistance is performable, or to cancel the request for lane change by lane change assistance and stop attempting lane change by lane change assistance.

A vehicle control device of a second aspect is the first aspect, further including a continuation necessity reception unit that receives a selection by the occupant related to whether or not to continue the request for a lane change by lane change assistance, and a driving assistance control unit. The driving assistance control unit continues attempting the lane change by lane change assistance in cases in which the lane change by lane change assistance has been determined to be difficult at the lane change possibility determination unit and the continuation necessity reception unit has received a selection to continue the request for a lane change by lane change assistance from the occupant, and stops attempting the lane change by lane change assistance in cases in which the lane change by lane change assistance has been determined to be difficult at the lane change viability determination unit and the continuation necessity reception unit has received a selection to stop attempting the lane change by lane change assistance from the occupant.

In the vehicle control device of the second aspect the selection of the occupant related to whether or not to continue the request for a lane change by lane change assistance is received by the continuation necessity reception unit. Attempting the lane change by lane change assistance by the driving assistance control unit is continued in cases in which the occupant continues to request the lane change by lane change assistance even though the lane change by lane change assistance has been determined to be difficult. However, the attempting the lane change by lane change assistance by the driving assistance control unit is stopped in cases in which the occupant requested to cancel the lane change by lane change assistance when the lane change by lane change assistance is determined to be difficult. This means that in conditions in which lane change by lane change assistance is difficult, the vehicle can be controlled so as to reflect the intentions of the occupant either to wait until the lane change is viable or to cancel the request for lane change by lane change assistance.

The vehicle control device of a third aspect is the second aspect, wherein the driving assistance control unit executes the lane change without the display instruction unit displaying the message on the display section in cases in which the lane change viability determination unit has determined that the lane change by lane change assistance is viable.

In the vehicle control device of the third aspect, the lane change is executed automatically by the driving assistance control unit without the message being displayed on the display section in cases in which determination has been made in the lane change viability determination unit that the lane change by lane change assistance is viable. Namely, the message is displayed on the display section only in cases in which the lane change by lane change assistance is difficult. Necessary display is accordingly only performed when needed, with the attention of the occupant only drawn to the display section when needed, thereby contributing to a lightening of the fatigue of the occupant. Note that reference to "execute a lane change" includes cases in which this is confined to outputting an instruction signal for lane change to another control device (for example, to an advance driver assistance system (ADAS)—electronic control unit (ECU) or the like) that control driving of actuators needed to execute an actual lane change.

A vehicle control device of a fourth aspect is the third aspect, wherein the display instruction unit displays the message on the display section in cases in which the lane change by lane change assistance has been determined to be difficult at the lane change viability determination unit after elapse of a specific period of time from when the lane change request reception unit received the request for a lane change by lane change assistance.

In the vehicle control device of the fourth aspect, the message asking whether or not to continue the request for lane change by lane change assistance is displayed on the display section by the display instruction unit in cases in which the lane change by lane change assistance has been determined to be difficult after elapse of a specific period of time from when the lane change request reception unit received the request for a lane change by lane change assistance from the occupant. Namely, the lane change is executed smoothly automatically in cases in which a lane change is viable, and the message is displayed in cases in which the lane change is still difficult even after elapse of a specific period of time. This accordingly enables the intentions of the occupant to be reflected by a minimum of notifications necessary.

A vehicle control device of a fifth aspect is the fourth aspect, wherein the driving assistance control unit stops attempting the lane change by lane change assistance in cases in which the selection by the occupant related to whether or not to continue the request for a lane change by lane change assistance has not been received in the continuation necessity reception unit within a specific period of time from when the message was displayed on the display section.

In the vehicle control device of the fifth aspect, attempting lane change by lane change assistance is stopped by the driving assistance control unit using lane change assistance in cases in which the selection of the occupant related to whether or not to continue the request for lane change by lane change assistance has not been received within the specific period of time from when the message was displayed on the display section. Namely, attempting the lane change by lane change assistance is stopped automatically in cases in which the occupant has not selected either to wait until lane change by lane change assistance is viable or to stop attempting lane change by lane change assistance within the specific period of time. This thereby enables energy consumption to be suppressed and also enables effort of operation by the occupant to be eliminated in cases in which the occupant requests to stop lane change by lane change assistance.

The vehicle control device of a sixth aspect is the first aspect, the vehicle control device further comprises a difficulty level computation unit that computes a difficulty level of the lane change by lane change assistance based on the surroundings information, and the display instruction unit displays the difficulty level computed by the difficulty level computation unit on the display section at least in cases in which the lane change by lane change assistance has been determined to be difficult at the lane change viability determination unit.

In the vehicle control device of the sixth aspect, the difficulty level of the lane change by lane change assistance is computed by the difficulty level computation unit based on the surroundings information. Moreover, the difficulty level computed by the difficulty level computation unit is displayed on the display section by the display instruction unit at least when the lane change by lane change assistance has been determined to be difficult. This accordingly enables an occupant to ascertain what sort of difficulty level the conditions are for lane change by lane change assistance, enabling determination of whether or not to continue the request for a lane change by lane change assistance according to this difficulty level.

A vehicle control device of a seventh aspect is a first aspect, wherein the display instruction unit displays the message on the display section when the lane change request reception unit has received the request for a lane change by lane change assistance.

In the vehicle control device of the seventh aspect, the message asking whether or not to continue the request for lane change is displayed on the display section in cases in which the lane change by lane change assistance has been determined to be difficult by display at a timing when the lane change request reception unit has received the request for lane change by lane change assistance. Namely, without waiting for determination by the lane change viability determination unit, decision-making as to whether or not to continue to a request for a lane change supposing the lane change were to become difficult can be made immediately by the occupant inputting a lane change using a turn indicator operation or the like.

A vehicle control device of an eighth aspect is the second aspect, wherein the display instruction unit displays, on the display section, alternative options comprising whether to continue waiting until the lane change by lane change assistance becomes viable, whether to cancel the lane change by lane change assistance, or whether to switch to manual driving.

In the vehicle control device of the eighth aspect, three choices are displayed by the display instruction unit on the display section in the vehicle cabin, these being whether to continue waiting until the lane change by lane change assistance becomes viable, whether to cancel the lane change by lane change assistance, or whether to switch to manual driving. Namely, there are two choices available when attempting lane change by lane change assistance is stopped, thereby enabling the occupant to select not only the choice to give up lane change entirely, but also the choice to switch to manual driving. This accordingly enables the occupant to attempt lane change manually in cases in which the occupant requests to change lanes with manual driving even supposing lane change by lane change assistance were to be difficult.

A vehicle control method of a ninth aspect is employed in a vehicle configured to perform lane change assistance and includes receiving a request for a lane change by lane change assistance from an occupant of the vehicle, acquiring surroundings information of the vehicle, when the request for a lane change by lane change assistance has been received, determining whether or not the lane change by lane change assistance is viable based on the surroundings information, and displaying a message, asking whether or not the request for a lane change by lane change assistance is to be continued, on a display section provided in a cabin of the vehicle in cases in which the lane change by lane change assistance has been determined to be difficult.

In the vehicle control method of the ninth aspect, the surroundings information of the vehicle configured to perform lane change assistance is acquired. Moreover, for example, the request for a lane change by lane change assistance is received from the occupant by the occupant performing an input operation such as a turn indicator operation or the like. Whether or not lane change by lane change assistance is viable is determined based on the surroundings information in cases in which the request for a lane change by lane change assistance has been received.

This message is displayed on the display section provided in the vehicle cabin. This message is a message asking whether or not to continue the request for a lane change by lane change assistance in cases in which the lane change by lane change assistance has been determined to be difficult. Namely, the occupant is asked whether to continue the request for a lane change by lane change assistance and simply wait until the lane change by lane change assistance is performable, or to cancel the request for lane change by lane change assistance and stop attempting the lane change by lane change assistance.

A non-transitory storage medium storing a vehicle control program of the tenth aspect is employed in a vehicle configured to perform lane change assistance and causes processing to be executed by a computer. The processing includes receiving a request for a lane change by lane change assistance from an occupant of the vehicle, acquiring surroundings information of the vehicle, when the request for a lane change by lane change assistance has been received, determining whether or not the lane change by lane change assistance is viable based on the surroundings information, and displaying a message, asking whether or not the request for a lane change by lane change assistance is to be continued, on a display section provided in a cabin of the vehicle in cases in which the lane change by lane change assistance has been determined to be difficult.

The non-transitory storage medium storing the vehicle control program of the tenth aspect acquires surroundings information of the vehicle configured to perform lane change assistance. Moreover, the request for lane change by lane change assistance is received from the occupant by, for example, the occupant performing an input operation such as a turn indicator operation or the like. The possibility of lane change by lane change assistance is determined based on the surroundings information in cases in which the request for a lane change by lane change assistance has been received.

This message is displayed on the display section provided in the vehicle cabin. This message is a message asking whether or not to continue the request for a lane change by lane change assistance in cases in which lane change by lane change assistance has been determined to be difficult. Namely, the occupant is asked whether to continue the request for a lane change by lane change assistance and simply wait until the lane change by lane change assistance is performable or to cancel the request for lane change by lane change assistance and stop attempting the lane change by lane change assistance.

The vehicle control device of the first aspect exhibits the excellent advantageous effect of being able to perform driving assistance reflecting the intentions of an occupant in conditions in which lane change is difficult.

The vehicle control device of the second aspect exhibits the excellent advantageous effect of being able to control a vehicle while reflecting the intentions of an occupant.

The vehicle control device of the third aspect exhibits the excellent advantageous effect of being able to improve the comfort of an occupant.

The vehicle control device of the fourth aspect exhibits the excellent advantageous effect of being able to perform driving assistance in which the intentions of an occupant are reflected by a minimum of notifications necessary.

The vehicle control device of the fifth aspect exhibits the excellent advantageous effect of being able to suppress energy consumption and also eliminate effort of operation by the occupant.

The vehicle control device of the sixth aspect exhibits the excellent advantageous effect of enabling the provision of information to assist decision-making of an occupant.

The vehicle control device of the seventh aspect exhibits the excellent advantageous effect of enabling ease of operation for an occupant to be improved.

The vehicle control device of the eighth aspect exhibits the excellent advantageous effect of enabling the provision of a choice of switching to manual driving to the occupant.

The vehicle control method of the ninth aspect exhibits the excellent advantageous effect of enabling driving assistance that reflects the intentions of the occupant to be performed in conditions in which lane change is difficult.

The non-transitory storage medium storing the vehicle control program of the tenth aspect exhibits the excellent advantageous effect of enable driving assistance that reflects the intentions of the occupant to be performed in conditions in which lane change is difficult.

BRIEF DESCRIPTION OF THE DRAWINGS

An exemplary embodiment of the present disclosure will be described in detail based on the following figures, wherein:

FIG. 4 is a table to explain an example of definitions of difficulty levels computed in the difficulty level computation unit illustrated in FIG. 3;

DETAILED DESCRIPTION

Description follows regarding an electronic control unit (ECU) 10 serving as a vehicle control device according to an exemplary embodiment of the present disclosure, with reference to FIG. 1 to FIG. 9. The ECU 10 is installed at a vehicle 12 illustrated in FIG. 1. The vehicle 12 is configured so as to be able to switch between autonomous driving and manual driving, and includes a lane change assistance function to assist lane changes. As an example, the vehicle 12 is furthermore equipped with a radar cruise control function that, when following a vehicle ahead traveling while maintaining a constant speed, follows by matching speed to the vehicle ahead, and with a lane tracing assist function that assists with operation of a steering wheel as necessary for lane keeping. Hereafter, the vehicle 12 will be called "ego-vehicle 12".

Ego-Vehicle 12 Configuration

Figure 1:
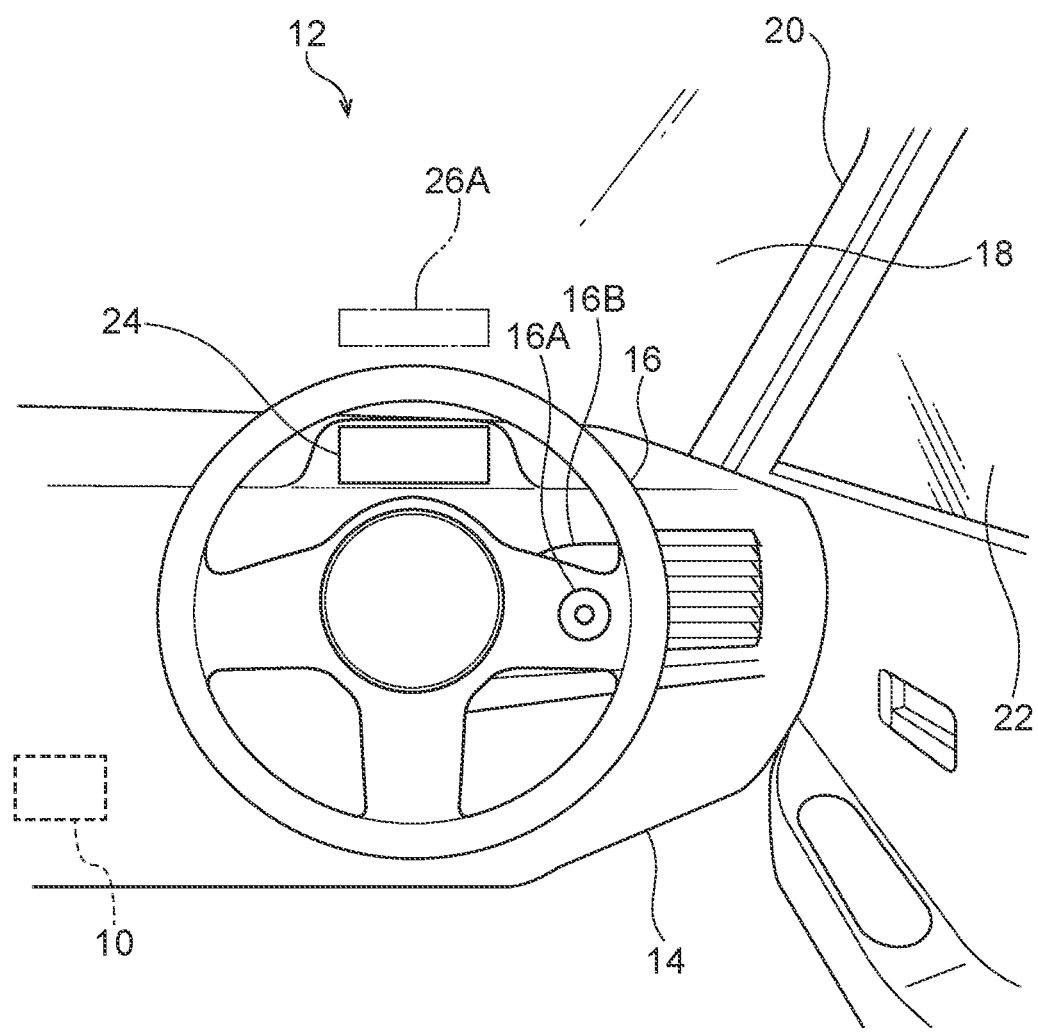
FIG. 1 is a perspective view illustrating a state looking at a vehicle cabin front section from a vehicle rear side in a vehicle equipped with an ECU serving as a vehicle control device according to an exemplary embodiment.

As illustrated in FIG. 1, an instrument panel 14 is provided to a front section in a vehicle cabin of the ego-vehicle 12. The instrument panel 14 extends in a vehicle width direction, and a steering wheel 16 is provided at a vehicle right side of the instrument panel 14. Namely, as an example of the present exemplary embodiment, the ego-vehicle 12 is a right hand drive vehicle with the steering wheel 16 provided on the right side, and a non-illustrated driver's seat is arranged at a right side of the interior of the vehicle cabin. The steering wheel 16 is provided with a steering switch 16A serving as a first input section operable by the occupant, and with a direction instruction device 16B serving as a second input section also operable by the occupant.

The instrument panel 14 described above is arranged at a vehicle lower side of a windshield glass 18. The windshield glass 18 is inclined with a downward sloping gradient toward the vehicle front side, and partitions between the vehicle cabin interior and the vehicle cabin exterior.

A vehicle right side end portion of the windshield glass 18 is fixed to a front pillar 20 on the vehicle right side. The front pillar 20 extends in a vehicle height direction, with the windshield glass 18 fixed to a vehicle width direction inside end portion of the front pillar 20. A front side-widow 22 is arranged at a vehicle rear side of the front pillar 20. Note that a vehicle left side end portion of the windshield glass 18 is fixed to a non-illustrated vehicle left side front pillar.

A meter display 24 serving as a first display section is provided at a vehicle front side of the driver's seat to an upper portion of the instrument panel 14. The meter display 24 is provided at a position entering a field of view of the occupant of the driver's seat of the ego-vehicle 12 (hereinafter simply referred to as "occupant") in a state in which a gaze of the occupant is directed toward the vehicle front side.

A head-up display (see FIG. 2, omitted from illustration in FIG. 1) 26 serving as a second display section is provided at the vehicle front side of the driver's seat to an upper portion of the instrument panel 14. The head-up display (referred to as "HUD" below) 26 is configured so as to be able to project an image onto a display area 26A set in a lower portion of the windshield glass 18 at the vehicle front side of the driver's seat. The HUD 26 is able to display an image superimposed on a forward scene viewed by the occupant of the ego-vehicle 12 through the windshield glass 18.

Onboard System 30 Configuration

Figure 2:
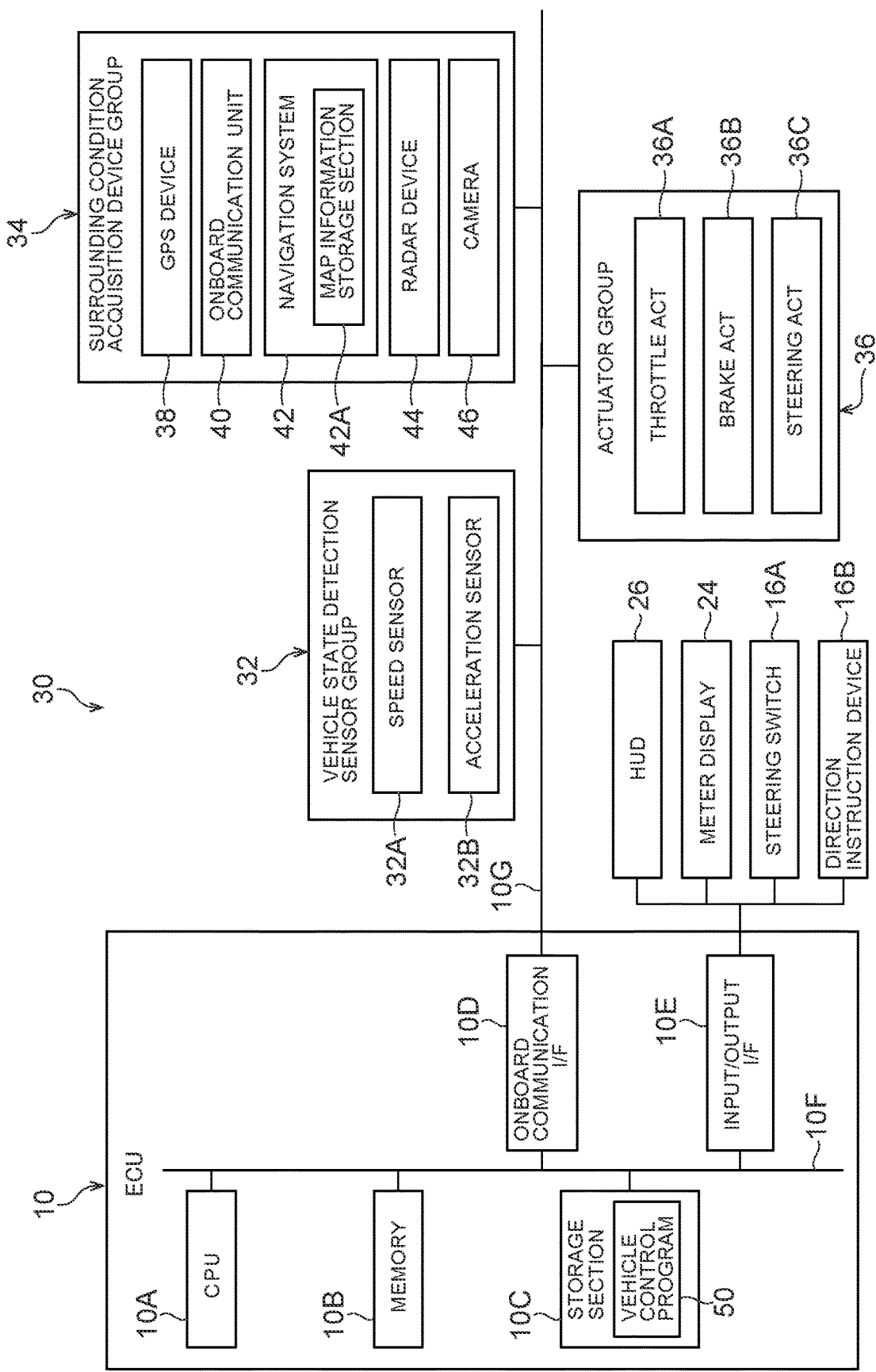
FIG. 2 is a block diagram illustrating part of a hardware configuration of an onboard system configured including the ECU illustrated in FIG. 1.

FIG. 2 is a block diagram illustrating a configuration of an onboard system 30 installed at the ego-vehicle 12. The onboard system 30 is configured including the ECU 10, a vehicle state detection sensor group 32 that acquires information related to a state of the ego-vehicle 12, a surrounding condition acquisition device group 34 that acquires information related to a surrounding condition of the ego-vehicle 12, and an actuator group 36. Note that only part of the onboard system 30 is illustrated in FIG. 2.

The ECU 10 is configured including a central processing unit (CPU) 10A, memory 10B such as read only memory (ROM) and random access memory (RAM), a non-transitory storage section 10C such as a hard disk drive (HDD) or a solid state drive (SSD), an onboard communication interface (I/F) 10D, and an input/output I/F 10E. The CPU 10A, the memory 10B, the storage section 10C, the onboard communication I/F 10D, and the input/output I/F 10E are connected together through an internal bus 10F so as to be able to communicate with each other.

The CPU 10A is a central processing unit that executes various programs and controls each section. Namely, the CPU 10A reads a program from the ROM of the memory 10B or from the storage section 10C, and executes the program using the RAM of the memory 10B as workspace. The CPU 10A controls each of the above configurations and performs various computational processing according to the program.

A vehicle control program 50 is stored in the storage section 10C. The ECU 10 performs a lane change lane change assistance of the ego-vehicle 12 under by the CPU 10A executing the vehicle control program 50.

The onboard communication I/F 10D is an interface for connection to the vehicle state detection sensor group 32, the surrounding condition acquisition device group 34, and the actuator group 36. The vehicle state detection sensor group 32, the surrounding condition acquisition device group 34, and the actuator group 36 are each connected to an external bus 10G that is connected to the onboard communication I/F 10D. A communication standard by CAN control is employed in the onboard communication I/F 10D.

The meter display 24 serving as the first display section, the HUD 26 serving as the second display section, the steering switch 16A serving as the first input section, and the direction instruction device 16B serving as the second input section, are each are electrically connected to the input/output I/F 10E.

Moreover, the vehicle state detection sensor group 32 is configured including a speed sensor 32A to detect a speed of the ego-vehicle 12 and an acceleration sensor 32B to detect acceleration imparted to the ego-vehicle 12, with these serving as plural sensors for acquiring a state of the ego-vehicle 12.

The surrounding condition acquisition device group 34 includes a global positioning system (GPS) device 38, an onboard communication unit 40, a navigation system 42, a radar device 44, a camera 46, and the like that serve as devices to acquire information representing what sort of conditions prevail in the peripheral environment of the ego-vehicle 12.

The GPS device 38 receives a GPS signal from plural GPS satellites, and measures the position of the ego-vehicle 12. The GPS device 38 has a positioning accuracy that is improved as the number of receivable GPS signals increases. The onboard communication unit 40 is a communication device that performs at least one of vehicle-to-vehicle communication with other vehicles, or vehicle-to-infrastructure communication with road infrastructure. The navigation system 42 includes a map information storage section 42A for storing map information, displays the position of the ego-vehicle 12 on a map based on location information obtained from the GPS device 38 and on the map information stored in the map information storage section 42A, and performs processing to guide a route to a target destination.

The radar device 44 includes plural radar devices having different detection ranges to each other, and detects surrounding targets such as pedestrians, other vehicles, and the like present in the surroundings of the ego-vehicle 12 as point cloud information, and acquires relative positions and relative speeds between the detected surrounding targets and the ego-vehicle 12. The radar device 44 is built into a processing device for processing detection results of surrounding targets. Based on changes in the relative position, relative speed, and the like of individual surrounding targets contained in plural most recent detections results, the processing device removes noise and roadside objects such as guard rails and the like from monitoring objects, and performs monitoring to track particular targets, such as pedestrians, other vehicles, and the like, as monitoring target objects. The radar device 44 then outputs information such as the relative position and relative speed to individual monitoring target objects. The camera 46 images the surroundings of the ego-vehicle 12 using plural cameras and outputs the captured images.

The actuator group 36 is configured including a throttle actuator (ACT) 36A to change the degree of opening of the throttle of the ego-vehicle 12, a brake ACT 36B to change the braking force generated by brakes of the ego-vehicle 12, and a steering ACT 36C to change an amount of steering by a steering device of the ego-vehicle 12.

The CPU 10A of the ECU 10 determines a condition based on information obtained from at least one of the vehicle state detection sensor group 32, the surrounding condition acquisition device group 34, the steering switch 16A, and the direction instruction device 16B, performs display on the HUD 26 or the meter display 24, and controls the actuator group 36 so as to execute a lane change.

ECU 10 Functional Configuration

Figure 3:
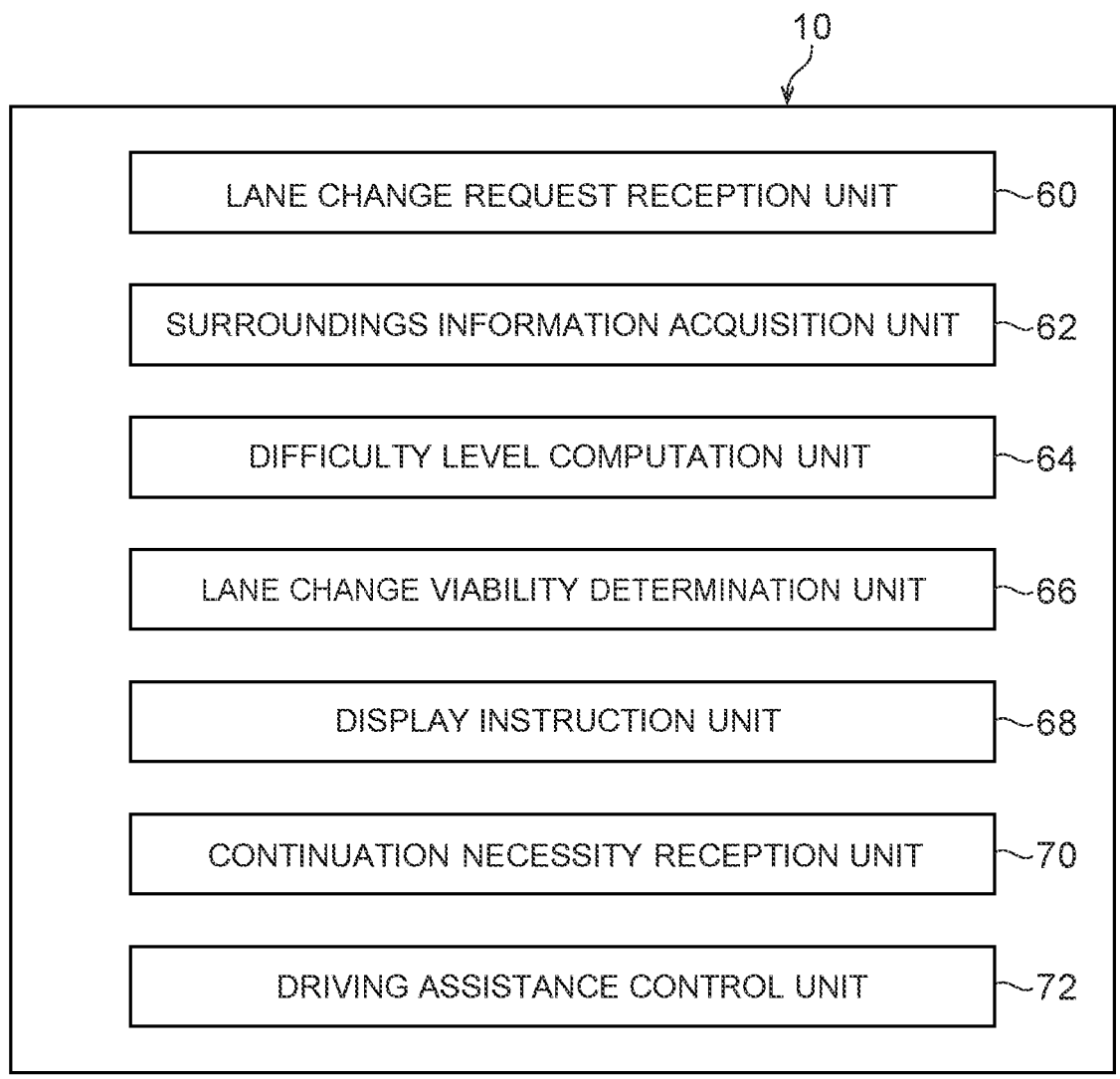
FIG. 3 is a block diagram illustrating a functional configuration of the ECU illustrated in FIG. 2.

As illustrated in FIG. 3, by the CPU 10A executing the vehicle control program 50, the ECU 10 functions as a lane change request reception unit 60, a surroundings information acquisition unit 62, a difficulty level computation unit 64, a lane change viability determination unit 66, a display instruction unit 68, a continuation necessity reception unit 70, and a driving assistance control unit 72. Description follows regarding each function.

The lane change request reception unit 60 includes a function to receive a request for a lane change by lane change assistance from the occupant through an input section provided in the vehicle cabin interior, such as the steering switch 16A, the direction instruction device 16B, or the like. As an example, in cases in which the occupant has operated the direction instruction device 16B during operation of radar cruise control and lane tracing assist, a request for a lane change from the cruising lane to a lane positioned in the direction (right or left) indicated by the occupant operating the direction instruction device 16B is taken as arising, and this request is received by the lane change request reception unit 60. Moreover, as another example, based on information acquired by the surroundings information acquisition unit 62, described later, the ECU 10 displays a display to propose a lane change on the display instruction unit 68, described later, and the lane change request reception unit 60 receives a request to change lanes when the occupant has operated the steering switch 16A to input a selection indicating the request to change lanes. Note that there is no limitation to these two examples, and the lane change request reception unit may receive a request for a lane change of the occupant from various input sections provided in the vehicle cabin.

The surroundings information acquisition unit 62 includes a function to acquire surroundings information of the ego-vehicle 12 from the surrounding condition acquisition device group 34.

The difficulty level computation unit 64 includes a function to compute a difficulty level of lane change by lane change assistance based on the surroundings information acquired by the surroundings information acquisition unit 62. As an example, as illustrated in FIG. 4, say there is a separation X between a front vehicle (omitted in the drawings) traveling further forward than the ego-vehicle 12 in a lane change destination lane (omitted in the drawings), and a rear vehicle (omitted in the drawings) traveling further rearward than the ego-vehicle 12 in the lane change destination lane, then the difficulty level of lane change by driving assistance is computed to be 0 when the separation X is greater than Am since there is sufficient inter-vehicle distance in the lane change destination lane. Moreover, difficulty levels are computed in four sequential steps depending on the size of the separation X, these being: a difficulty level 1 determined when X is greater than Bm but not greater than Am; a difficulty level 2 determined when X is greater than Cm but not greater than Bm, and a difficulty level 3 determined when X is not greater than Cm. Note that difficulty levels are not limited to four steps. Moreover, the difficulty level computation method is also not limited to that described above and, for example, the difficulty level computation unit 64 may compute the difficulty level by combining the inter-vehicle distance between other vehicles present in the lane change destination lane with information such as relative speed or the like between other vehicles present in the lane change destination lane and the ego-vehicle 12.

The lane change viability determination unit 66 includes a function to determine whether or not a lane change is viable based on surroundings information acquired by the surroundings information acquisition unit 62 in cases in which a request for a lane change has been received from the occupant by the request for a lane change request reception unit 60. As an example, the lane change viability determination unit 66 determines a lane change by lane change assistance to be viable only in cases in which the difficulty level computed by the difficulty level computation unit 64 is 0, and determines that lane change by lane change assistance is difficult in cases in which the difficulty level is from level 1 to 3.

The display instruction unit 68 includes a function to display a message on a display section provided in the vehicle cabin, such as the meter display 24, the HUD 26, or the like, asking whether or not to continue with the request for a lane change when determined in the lane change viability determination unit 66 that a lane change by lane change assistance is difficult. Namely, the occupant is asked whether to continue with the request for a lane change and to wait for lane change by lane change assistance, or to cancel the request for a lane change and stop attempting lane change by lane change assistance.

Figure 6:
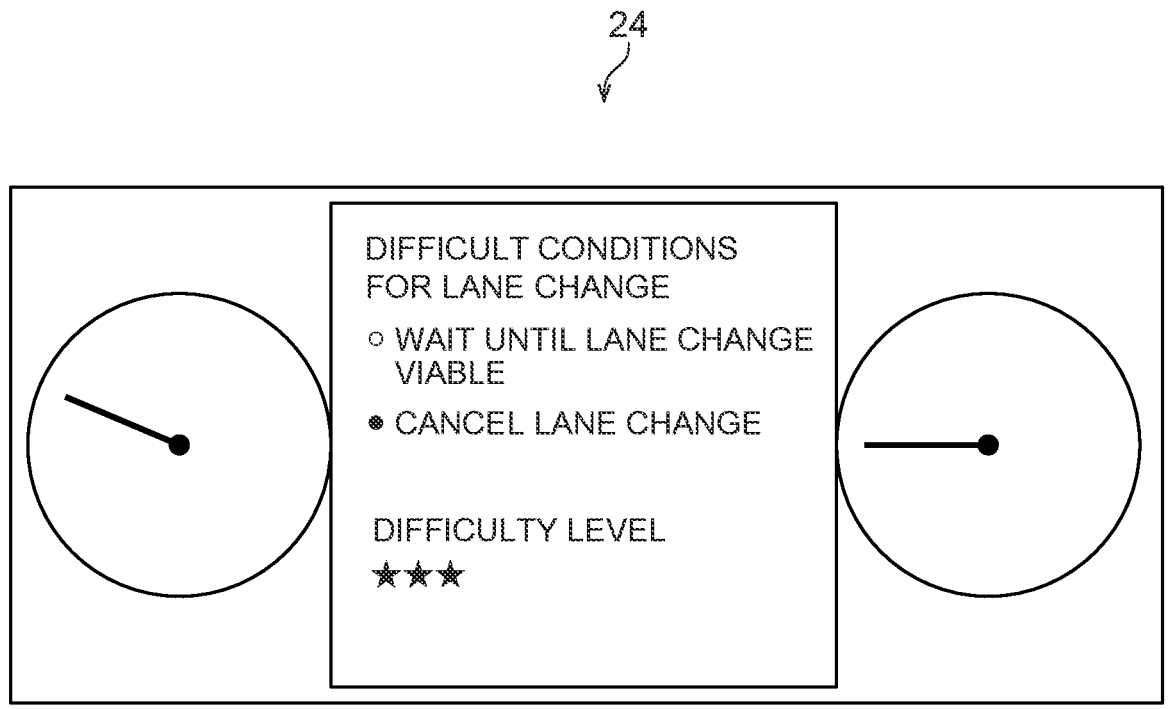
FIG. 6 is an example of an image displayed on the meter display illustrated in FIG. 1 in the first example processing illustrated in FIG. 5.

As an example, in a first example of a processing program, described later, in cases in which determination has been made in the lane change viability determination unit 66 that lane change is difficult after elapse of a specific period of time from receipt of the request for a lane change by the request for a lane change request reception unit 60, the display instruction unit 68 displays a message on the meter display 24 to inform that conditions for lane change are difficult, e.g. "Difficult conditions for lane change" as illustrated in FIG. 6, combined with the computed difficulty level. When this is performed, the display instruction unit 68 displays two choices on the meter display 24: "Wait until lane change viable" or "Cancel lane change", namely a message, asking whether or not to continue with the request for a lane change combined with the above messages. Note that words asking whether or not to continue with the request for a lane change are not limited to those given above.

Figure 7:
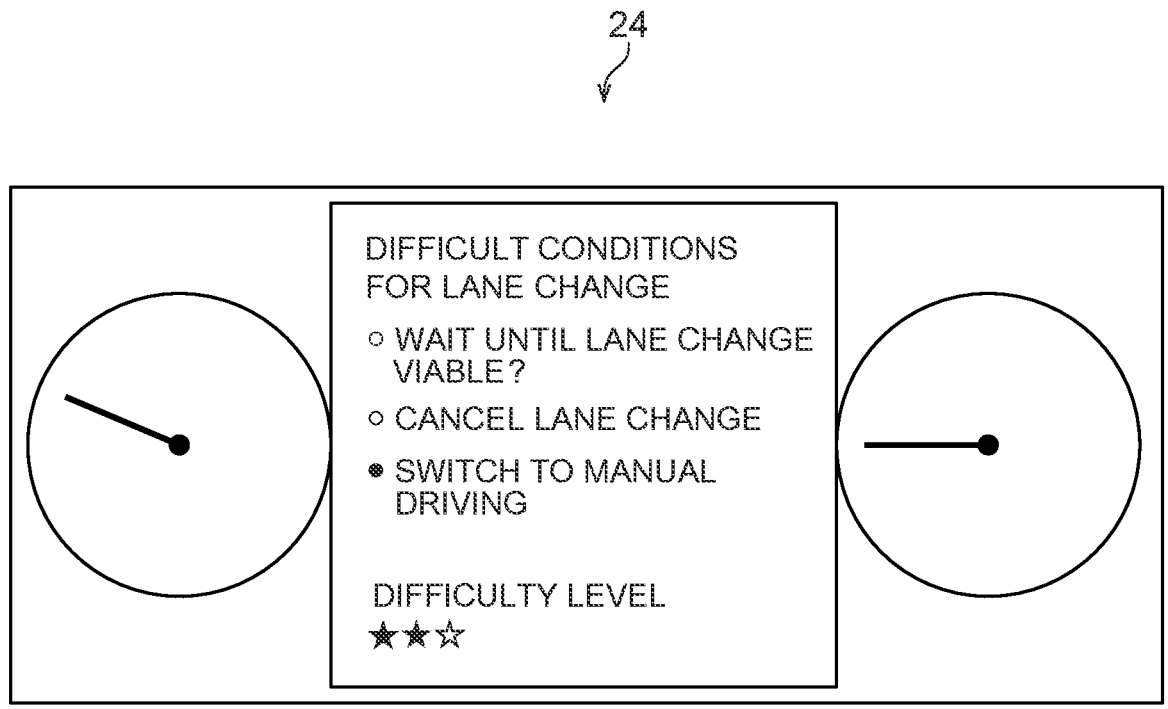
FIG. 7 is a different example of an image displayed on the meter display illustrated in FIG. 1 in the first example processing illustrated in FIG. 5.

Moreover, as another example of choices provided to the occupant, the display instruction unit 68 may display three choices on the meter display 24 as illustrated in FIG. 7: "Wait until lane change viable", "Cancel lane change", or "Switch to manual driving". In the example illustrated in FIG. 6 and FIG. 7, the difficulty levels are steps displayed by filling in three stars, however the method of displaying the difficulty level is not limited thereto and, for example, a display instruction unit may display difficulty levels on the display section using a bar graph or by different colors. Moreover, numerical values of difficulty level computed in the display instruction unit may be displayed directly on a display section. Furthermore, for example, verbal expressions such as "Extremely difficult", "Quite difficult", and the like may be displayed.

Figure 9:
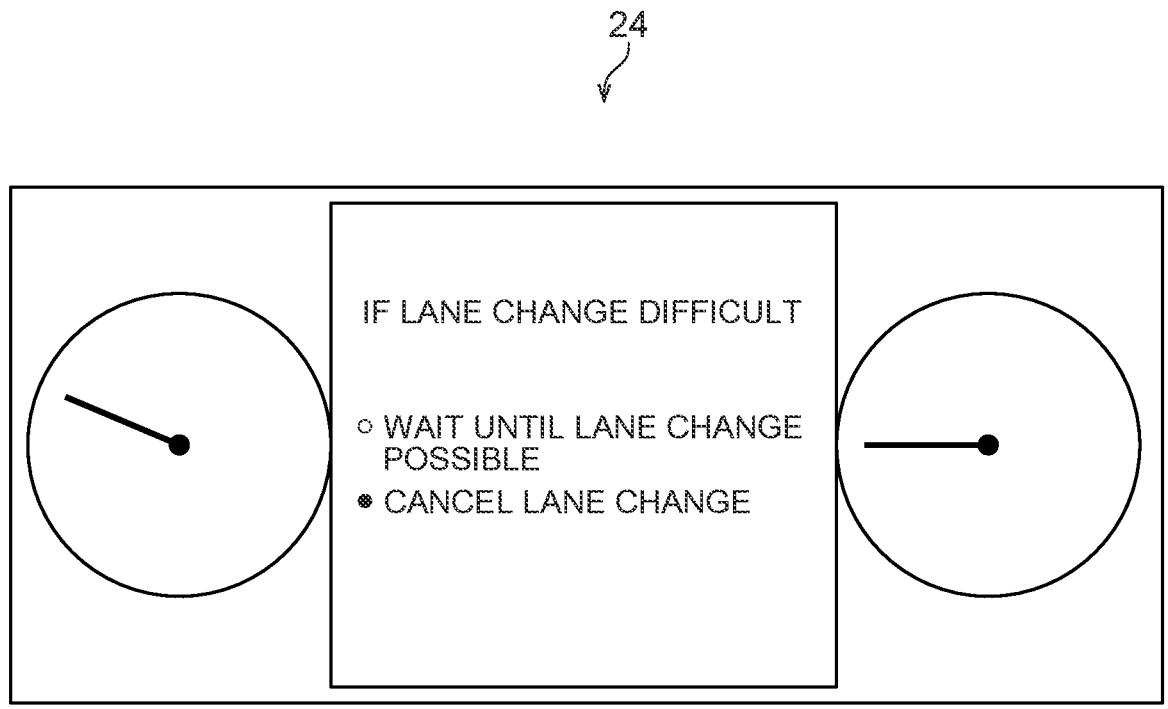
FIG. 9 is an example of an image displayed on the meter display illustrated in FIG. 1 in the second example processing illustrated in FIG. 8.

Furthermore as another example, in a second example processing program, described later, when the lane change request reception unit 60 has received the request for a lane change, the display instruction unit 68 displays on the meter display 24 a message, as illustrated in FIG. 9, asking the requests of the occupant in advance "Which action should be taken if lane change is difficult?", together with two choices of "Wait until lane change viable" or "Cancel lane change".

The continuation necessity reception unit 70 includes a function to receive a selection of the occupant related to whether or not to continue with the request for a lane change. Namely, the continuation necessity reception unit 70 receives a selection on one of the display screens of the examples given in FIG. 6, FIG. 7, and FIG. 9 when the occupant has made a selection through an input section, such as the steering switch 16A or the like, of "Wait until lane change viable", "Cancel lane change", or "Switch to manual driving".

The driving assistance control unit 72 includes a function to execute a lane change by lane change assistance in cases in which the lane change viability determination unit 66 has determined that a lane change is viable.

The driving assistance control unit 72 includes a function to continue attempting lane change by lane change assistance in cases in which lane change by lane change assistance has been determined to be difficult at the lane change viability determination unit 66 and the continuation necessity reception unit 70 has received a selection from the occupant to continue the request for a lane change, and to stop attempting lane change by lane change assistance in cases in which lane change by lane change assistance has been determined to be difficult at the lane change viability determination unit 66 and the continuation necessity reception unit 70 has received a selection from the occupant to stop attempting lane change by lane change assistance.

As an example, in the first example processing program described later, the driving assistance control unit 72 stops attempting lane change by lane change assistance in cases in which the occupant has selected "Cancel lane change" illustrated in FIG. 6 or FIG. 7, and continues driving assistance of radar cruise control and lane tracing assist.

The driving assistance control unit 72 stops attempting lane change by lane change assistance when a selection of an occupant related to whether or not to continue the request for a lane change has not been received in the continuation necessity reception unit 70 within a specific period of time from when the message illustrated in the examples of FIG. 6 or FIG. 7 was displayed on the meter display 24.

However, when the choice "Switch to manual driving" illustrated in FIG. 7 has been selected by the occupant, the driving assistance control unit 72 not only stops attempting the lane change by lane change assistance, but also stops driving assistance of radar cruise control and lane tracing assist and switches from autonomous driving to manual driving.

Processing Flow First Example

Figure 5:
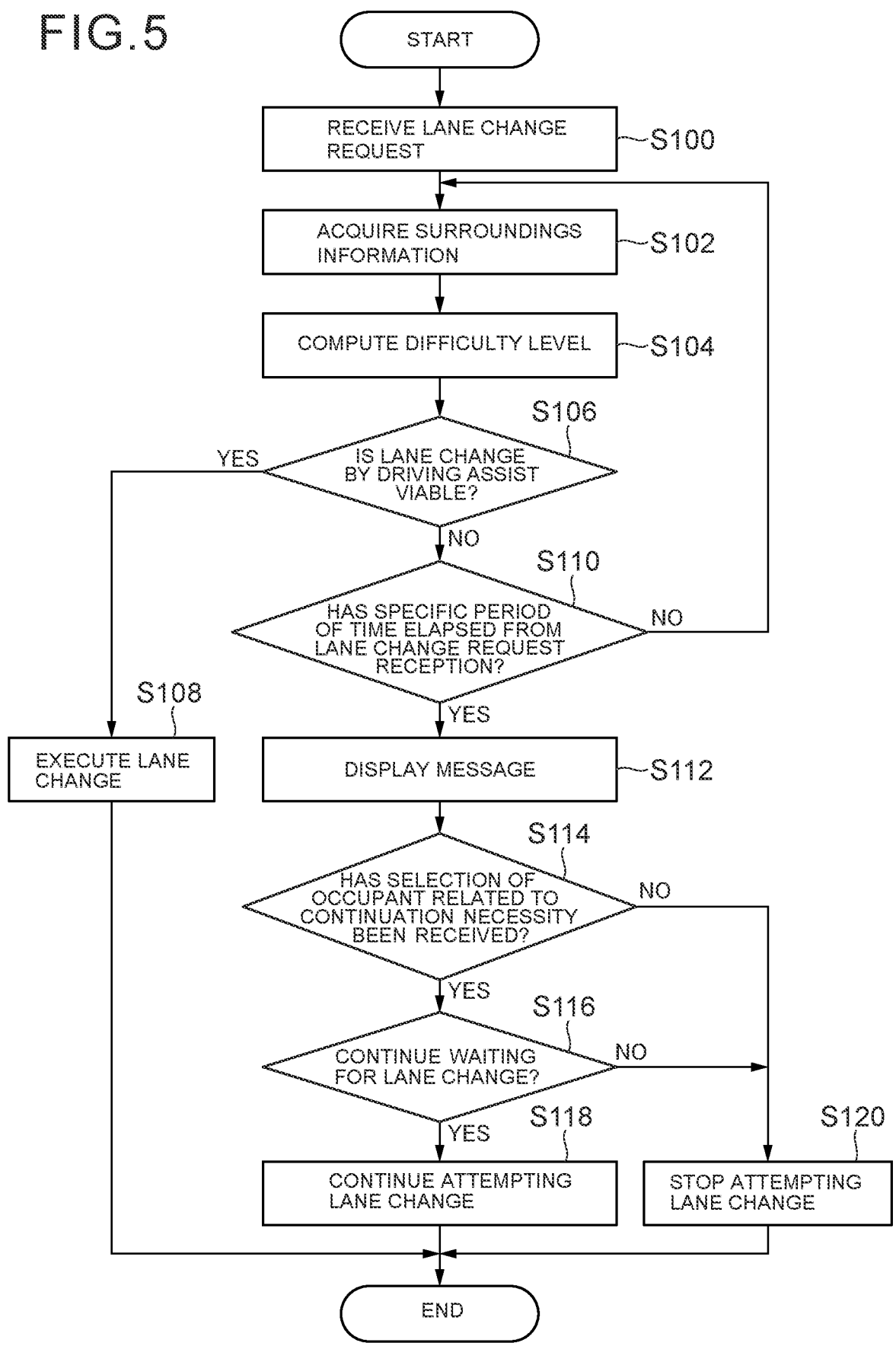
FIG. 5 is a flowchart illustrating a first example of a flow of processing performed in the ECU illustrated in FIG. 2.

Next, description follows regarding a first example of processing flow executed in the ECU 10, with reference to FIG. 5 to FIG. 7.

At step S100 of FIG. 5, the CPU 10A of the ECU 10 receives a request for a lane change by lane change assistance from an occupant through an input section provided in the vehicle cabin such as the steering switch 16A, the direction instruction device 16B, or the like.

At step S102, the CPU 10A of the ECU 10 acquires surroundings information of the ego-vehicle 12.

At step S104, the CPU 10A of the ECU 10 computes a difficulty level of lane change by lane change assistance based on the surroundings information.

At step S106, the CPU 10A of the ECU 10 determines whether or not lane change by lane change assistance is viable based on the computed difficulty level.

At step S108, the CPU 10A of the ECU 10 executes lane change in cases in which determination at step S106 was that lane change by lane change assistance is viable and then ends processing.

However, in cases in which determination at step S106 was that lane change by lane change assistance is difficult, the CPU 10A of the ECU 10 determines whether or not a specific period of time has elapsed from receipt of the request for a lane change at step S110.

The CPU 10A of the ECU 10 re-executes the processing from step S102 onward in cases in which determination at step S110 was that the specific period of time has not elapsed from receipt of the request for a lane change.

However, at step S112 the CPU 10A of the ECU 10 displays the message illustrated in FIG. 6 on the meter display 24 when determination at step S110 was that the specific period of time has elapsed from receipt of the request for a lane change.

At step S114, the CPU 10A of the ECU 10 determines whether or not an occupant selection has been received related to whether or not to continue the request for a lane change.

In cases in which determination at step S114 was that an occupant selection has been received, at step S116 the CPU 10A of the ECU 10 determines whether or not this selection was to continue the request for a lane change of "Wait until lane change viable", or was to not continue the request for a lane change of "Cancel lane change".

In cases in which determination at step S116 was that the occupant selection was to "Wait until lane change viable", namely a determination that the occupant requests to continue with the request to change lanes, then at step S118 the CPU 10A of the ECU 10 continues the lane change assistance and ends the current sequence of processing.

However, in cases in which determination at step S116 was that the occupant selection was to "Cancel lane change", namely a determination that the occupant requests not to continue the request for a lane change, then at step S120 the CPU 10A of the ECU 10 stops attempting lane change by lane change assistance, and ends the current sequence of processing. Note that in cases in which the occupant has selected "Switch to manual driving" illustrated in FIG. 7, the CPU 10A of the ECU 10 stops attempting lane change by lane change assistance and also stops driving assistance of radar cruise control and lane tracing assist, and ends the current sequence of processing.

In cases in which determination at step S114 was that occupant selection has not been received, at step S120 the CPU 10A of the ECU 10 stops attempting lane change by lane change assistance and ends the current sequence of processing.

Processing Flow Second Example

Figure 8:
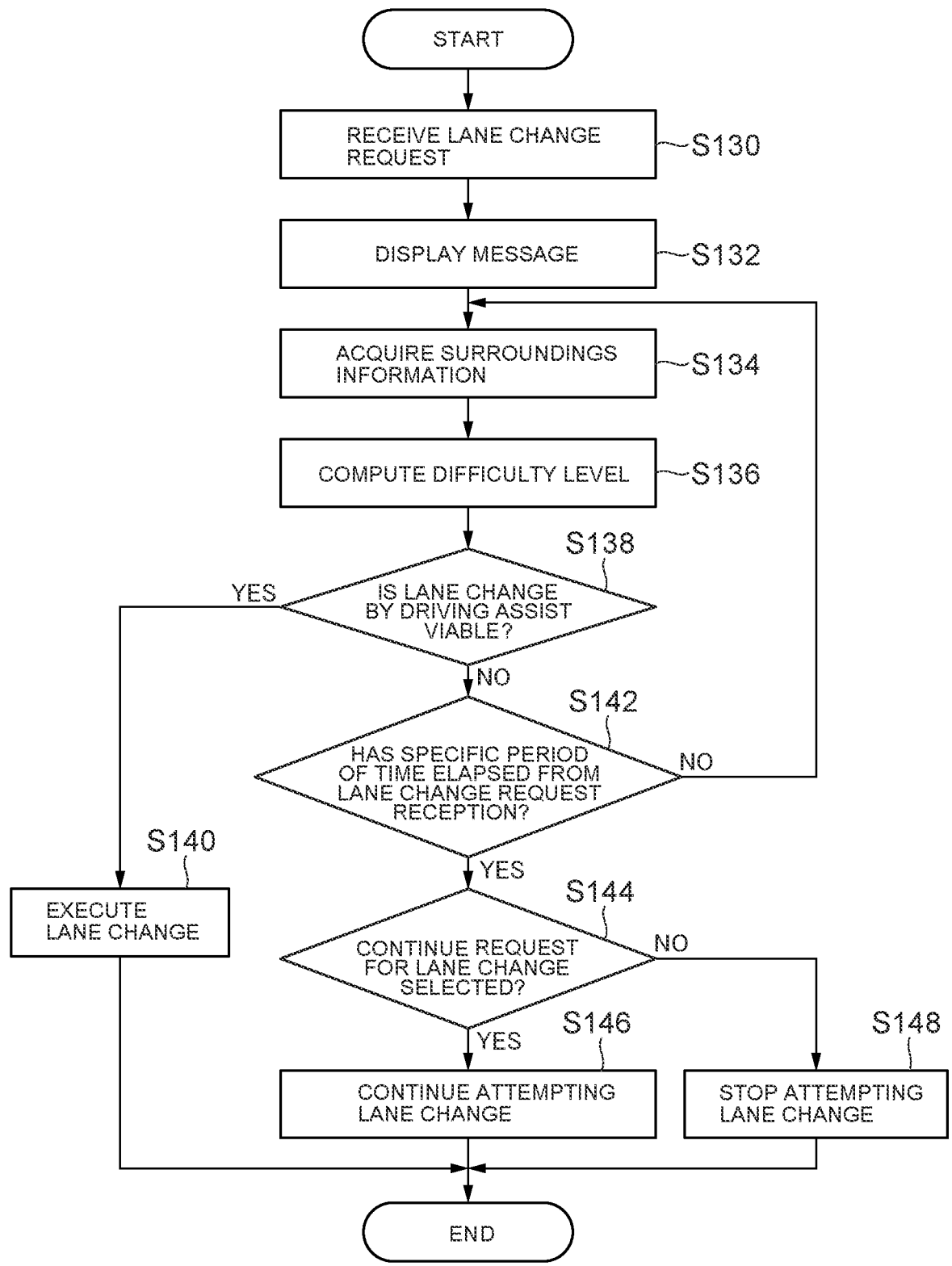
FIG. 8 is a flowchart illustrating a second example of a flow of processing performed in the ECU illustrated in FIG. 2.

Next description follows regarding a second example of processing flow executed by the ECU 10, with reference to FIG. 8 and FIG. 9.

At step S130 of FIG. 8, the CPU 10A of the ECU 10 receives a request for a lane change by lane change assistance from an occupant through an input section provided in the vehicle cabin, such as the steering switch 16A, the direction instruction device 16B, or the like.

At step S132, the CPU 10A of the ECU 10 displays, on the meter display 24, a message as illustrated in FIG. 9 asking whether or not to continue the request for a lane change in cases in which lane change is difficult.

At step S134, the CPU 10A of the ECU 10 acquires surroundings information of the ego-vehicle 12.

At step S136, the CPU 10A of the ECU 10 computes a difficulty level of lane change by lane change assistance based on the surroundings information.

At step S138, the CPU 10A of the ECU 10 determines whether or not lane change by lane change assistance is viable based on the computed difficulty level.

In cases in which determination at step S138 was that lane change by lane change assistance is viable, the CPU 10A of the ECU 10 executes the lane change at step S140 and ends the current sequence of processing.

However, in cases in which determination at step S138 was that lane change by lane change assistance is difficult, the CPU 10A of the ECU 10 determines at step S142 whether or not the specific period of time has elapsed from receipt of the request for a lane change.

The CPU 10A of the ECU 10 re-executes the processing of steps S134 onward in cases in which determination at step S142 was that the specific period of time has not elapsed from receipt of the request for a lane change.

However, in cases in which determination at step S142 is that the specific period of time has elapsed from receipt of the request for a lane change, at step S144 the CPU 10A of the ECU 10 determines whether or not the selection to continue the request for a lane change has been pre-selected in advance by the occupant.

In cases in which determination at step S144 was that the selection to continue the request for a lane change of "Wait until lane change viable" has been pre-selected in advance by the occupant at step S144, at step S146 the CPU 10A of the ECU 10 continues attempting lane change by lane change assistance and ends the current sequence of processing.

However, in cases in which determination at step S144 was that the selection to continue the request for a lane change had not been pre-selected in advance by the occupant at step S144, namely in cases in which occupant selection was "Cancel lane change" or the occupant had not selected any of the choices, at step S148 the CPU 10A of the ECU 10 stops attempting lane change by lane change assistance and ends the current sequence of processing.

Operation and Advantageous Effects of Present Exemplary Embodiment

The ECU 10 according to the present exemplary embodiment continues attempting lane change by lane change assistance using the driving assistance control unit 72 in cases in which the occupant continues with the request for a lane change even though the lane change viability determination unit 66 has determined that lane change by lane change assistance is difficult. However, in cases in which lane change by lane change assistance was determined to be difficult in the lane change viability determination unit 66 and the occupant requests to cancel lane change by lane change assistance, attempting lane change by lane change assistance using the driving assistance control unit 72 is stopped. This thereby enables the ego-vehicle 12 to be controlled so as to reflect the intentions of the occupant.

Moreover, with the ECU 10 according to the present exemplary embodiment, lane change is executed automatically using the driving assistance control unit 72 without displaying a message on the meter display 24 in cases in which the lane change viability determination unit 66 has determined that lane change by lane change assistance is viable. Namely, a message is only displayed on the meter display 24 when lane change by lane change assistance is difficult. Necessary display is accordingly only performed when needed, with the attention of the occupant only drawn to the meter display 24 when needed, thereby contributing to a lightening of the fatigue of the occupant.

Furthermore, with the ECU 10 according to the present exemplary embodiment, in the first example processing program a message asking whether or not to continue the request for a lane change is displayed on the meter display 24 using the display instruction unit 68 in cases in which determination has been made that lane change by lane change assistance is difficult after elapse of a specific period of time from when the lane change request reception unit 60 received the request for a lane change from the occupant. Namely, lane change is executed automatically in cases in which as smooth lane change is viable, and a message is displayed in cases in which lane change is still difficult after a specific period of time has elapsed. This thereby enables the intentions of an occupant to be reflected by a minimum of notifications necessary.

Furthermore, with the ECU 10 according to the present exemplary embodiment, attempting lane change by lane change assistance using the driving assistance control unit 72 is stopped in cases in which an occupant selection in relation to whether or not to continue the request for a lane change has not been received within the specific period of time from when the message was displayed on the meter display 24. Namely, in cases in which the occupant has not selected to wait until a lane change is viable and has not selected to cancel the lane change within the specific period of time, attempting lane change by lane change assistance is cancelled automatically anyway. This thereby enables energy consumption to be suppressed as well as enabling a burden of operation by the occupant to be eliminated when the occupant requests to cancel the lane change.

Moreover, the ECU 10 according to the present exemplary embodiment displaying the difficulty level enables an occupant to ascertain what sort of difficulty level the conditions are for lane change, enabling determination of whether or not to continue the request for a lane change according to this difficulty level.

Furthermore, with the ECU 10 according to the present exemplary embodiment, in the second example processing program, a message is displayed on the meter display 24 asking whether or not to continue the request for a lane change in cases in which lane change is difficult by being displayed at the timing when the lane change request reception unit 60 has received the request to change lanes. Namely, the occupant inputs a lane change by operation of the direction instruction device 16B or the like and then is immediately able perform decision-making as to whether or not to continue the request to change lanes supposing the lane change were to be difficult even without waiting for determination by the lane change viability determination unit 66.

Furthermore, the ECU 10 according to the present exemplary embodiment uses the display instruction unit 68 to display three choices on the meter display 24: whether to continue to wait until lane change by lane change assistance becomes viable; whether to cancel the lane change; or whether to switch to manual driving. Namely, there are two choices when attempting lane change by lane change assistance is cancelled, enabling the occupant to not only choose to give up on lane change entirely, but also to select a choice of switching to manual driving. This means that suppose that lane change by lane change assistance is difficult, the occupant is able to attempt lane change by manual driving in cases in which the occupant requests to perform lane change by manual driving.

Supplementary Explanation to Above Exemplary Embodiment

Although in the above exemplary embodiment an example was described in which the display instruction unit 68 displayed messages on the meter display 24 or the HUD 26, there is no limitation thereto. A display instruction unit may display messages on another display section provided in the vehicle cabin, such as a navigation system display or the like.

Although in the above exemplary embodiment an example was described in which the ECU 10 directly controlled the actuator group 36 so as to execute a lane change, there is no limitation thereto. For example, the vehicle control device may output an instruction signal to change lanes to an ADAS-ECU connected to an actuator group.

Furthermore, in the above exemplary embodiment the first example processing program was described in which the display instruction unit 68 displays a message on the meter display 24 in cases in which determination has been made that lane change is difficult after the specific period of time has elapsed from when the lane change request reception unit 60 received a request for a lane change. Moreover, the second example processing program was described in which the display instruction unit 68 displayed messages on the meter display 24 when the lane change request reception unit 60 has received the request for a lane change. There is, however, no limitation thereto, and a display instruction unit may display a message on a display section at another timing. For example, such display may be performed on a lane change assistance setting screen.

Furthermore, in the above exemplary embodiment, although the first example processing program has been described for a case in which the driving assistance control unit 72 stops attempting lane change in cases in which an occupant selection has been received within the specific period of time from when the message is displayed on the meter display 24, there is no limitation thereto. For example, a driving assistance control unit may continue to attempting lane change until an occupant selection has been received.

Moreover, in the above exemplary embodiment, although the first example processing program has been described for a case in which the display instruction unit 68 displays the difficulty level computed in the difficulty level computation unit 64 on the meter display 24, there is no limitation thereto, and a configuration may be adopted in which the display instruction unit does not display a difficulty level on the display section.

What is claimed is:

1. A vehicle control device that is installed at a vehicle configured to perform lane change assistance and that comprises a processor, wherein the processor is configured to:
   receive a request for a lane change by lane change assistance from an occupant of the vehicle;
   acquire surroundings information of the vehicle;
   when the request for a lane change has been received, determine whether or not the lane change by lane change assistance is permissible when an inter-vehicle distance in a lane change destination lane exceeds a first calculated threshold value based on the acquired surroundings information; and
   display a message, asking whether to wait until a lane change is permissible, on a display section provided in a cabin of the vehicle in cases in which the lane change by lane change assistance has been determined to be not permissible when the inter-vehicle distance in the lane change destination lane is equal to or less than the first calculated threshold.

2. The vehicle control device of claim 1, wherein the processor is further configured to:
   receive a selection by the occupant related to whether or not to continue the request for a lane change by lane change assistance;
   continue attempting the lane change by lane change assistance in cases in which the lane change by lane change assistance has been determined to be not permissible and a selection to continue the request for a lane change by lane change assistance has been received from the occupant; and
   stop attempting the lane change by lane change assistance in cases in which the lane change by lane change assistance has been determined to be not permissible and a selection to stop attempting the lane change by lane change assistance has been received from the occupant.

3. The vehicle control device of claim 2, wherein the lane change by lane change assistance is executed without displaying the message on the display section in cases in which the lane change by lane change assistance has been determined to be permissible.

4. The vehicle control device of claim 3, wherein the processor is configured to display the message on the display section in cases in which the lane change by lane change assistance has been determined to be not permissible after elapse of a specific period of time from when the request for a lane change by lane change assistance was received.

5. The vehicle control device of claim 4, wherein the processor is configured to stop attempting the lane change by lane change assistance in cases in which the selection by the occupant related to whether or not to continue the request for a lane change by lane change assistance has not been received within a specific period of time from when the message was displayed on the display section.

6. The vehicle control device of claim 1, wherein the processor is configured to:
compute a not permissible level of the lane change by lane change assistance based on the surroundings information; and
display the not permissible level computed on the display section at least in cases in which the lane change by lane change assistance has been determined to be not permissible.

7. The vehicle control device of claim 1, wherein the processor is configured to display the message on the display section when the request for a lane change by lane change assistance has been received.

8. The vehicle control device of claim 2, wherein the processor is configured to display, on the display section, alternative options comprising whether to continue waiting until the lane change by lane change assistance becomes permissible, whether to stop attempting the lane change by lane change assistance, or whether to switch to manual driving.

9. A vehicle control method according to which a computer executes processing employed in a vehicle configured to perform lane change assistance, the processing comprising, by a processor:
receiving a request for a lane change by lane change assistance from an occupant of the vehicle;
acquiring surroundings information of the vehicle;
when the request for a lane change by lane change assistance has been received, determining whether or not the lane change by lane change assistance is permissible when an inter-vehicle distance in a lane change destination lane exceeds a first calculated threshold value based on the surroundings information; and
displaying a message, asking whether to wait until a lane change is permissible, on a display section provided in a cabin of the vehicle in cases in which the lane change by lane change assistance has been determined to be not permissible when the inter-vehicle distance in the lane change destination lane is equal to or less than the first calculated threshold.

10. A non-transitory storage medium storing a program executable by a computer to perform processing employed in a vehicle configured to perform lane change assistance, the processing comprising:
receiving a request for a lane change by lane change assistance from an occupant of the vehicle;
acquiring surroundings information of the vehicle;
when the request for a lane change by lane change assistance has been received, determining whether or not the lane change by lane change assistance is permissible when an inter-vehicle distance in a lane change destination lane exceeds a first calculated threshold value based on the surroundings information; and
displaying a message, asking whether to wait until a lane change is permissible, on a display section provided in a cabin of the vehicle in cases in which the lane change by lane change assistance has been determined to be not permissible when the inter-vehicle distance in the lane change destination lane is equal to or less than the first calculated threshold.

11. The vehicle control device of claim 1, wherein the processor is configured to receive the request for a lane change by lane change assistance of the occupant from an input unit provided in the vehicle cabin.

12. The vehicle control device of claim 6, wherein the processor computes the not permissible level in accordance with an inter-vehicle distance between other vehicles present in a lane change destination lane.

13. The vehicle control device of claim 12, wherein the processor computes the not permissible level in accordance with the inter-vehicle distance and a relative speed between the vehicle itself and another vehicle present in the lane change destination lane.

* * * * *